March 7, 1933.    R. L. DRAKE    1,900,637
CAPPING MACHINE
Original Filed Aug. 13, 1924    9 Sheets—Sheet 1

FIG.I.

March 7, 1933.  R. L. DRAKE  1,900,637
CAPPING MACHINE
Original Filed Aug. 13, 1924  9 Sheets-Sheet 4

FIG.4.

Inventor
Rollin L. Drake
By his Attorney
R. J. Dearborn

March 7, 1933.    R. L. DRAKE    1,900,637
CAPPING MACHINE
Original Filed Aug. 13, 1924    9 Sheets-Sheet 7

Inventor
Rollin L. Drake
By his Attorney
R. J. Dearborn

Patented Mar. 7, 1933

1,900,637

UNITED STATES PATENT OFFICE

ROLLIN L. DRAKE, OF PORT ARTHUR, TEXAS, ASSIGNOR TO THE TEXAS COMPANY, OF NEW YORK, N. Y., A CORPORATION OF DELAWARE

CAPPING MACHINE

Original application filed August 13, 1924, Serial No. 731,730. Now Patent No. 1,823,889. Divided and this application filed April 30, 1929. Serial No. 359,196.

The invention relates to devices for applying caps, or other sealing means, to containers, and more particularly to cans, which have been filled with some fluid material through an opening in the top.

This is a division of my pending application Ser. No. 731,730 filed August 13, 1924. In the parent case there is disclosed a complete machine for automatically weighing out definite quantities of fluid material, such as kerosene or gasoline, introducing the measured quantities of such material into suitable containers, and then sealing or applying a cap to the opening in the containers. The construction is such that a large number of receptacles may be operated upon at one time and it is such, furthermore, that both the filling and capping functions may be carried out simultaneously with respect to two different groups of containers. For this purpose a rotary member or endless conveyor is adapted to receive empty containers from one point and carry them through a complete cycle to another point, at which they are discharged from the machine. During the course of their transit, these containers are first filled and then capped. The measurement of the quantity of fluid to be discharged into each container takes place during the capping portion of the cycle of the machine, so that these measured quantities are available for introduction into new containers during the next cycle. By virtue of this arrangement a large number of cans may be first filled and then capped in cyclic succession, a number undergoing each of these operations simultaneously.

One of the features of the machine is the construction which permits at least one of the capping tools or elements to be in operation at all times thereby speeding up the operation and increasing the output or capacity of a single machine.

A particular feature of the invention is the mounting of a plurality of capping tools on a rotary element or endless conveyor so that the capping operation may be continuously performed upon a series of containers as they are transferred from one point to another.

Another feature is the provision of a capping tool which is slidable or may be shifted into co-operation with a container on a support and then rendered effective to seal the container or crimp a cap placed over the opening in the latter.

Still another feature is the method of mounting certain crimping devices, such as rollers, which are adapted to engage the edges of the caps to be crimped. These rollers are adjustably mounted on the rotating spindle of the crimping tool so that they may be normally spread apart, to permit their introduction on opposite sides of the edge of the cap, and then may be forced together to grip the edge for the crimping operation.

A further feature is the method of operating the crimping devices to secure the cap in position on the container. For this purpose the main shaft or spindle of the tool is rotated continuously in such a way as to permit the sliding of the tool in the manner previously indicated.

Other features and advantages of the invention will become apparent from the following detailed description of an illustrative machine embodying the invention. While the improvements have been shown as applied to a specific type of machine involving both the dispensing and capping functions, it is to be understood that the various features are of broader application and may be used with only slight modifications in various other relations. In the drawings, which disclose the illustrative machine.

Main machine

Figure 1:
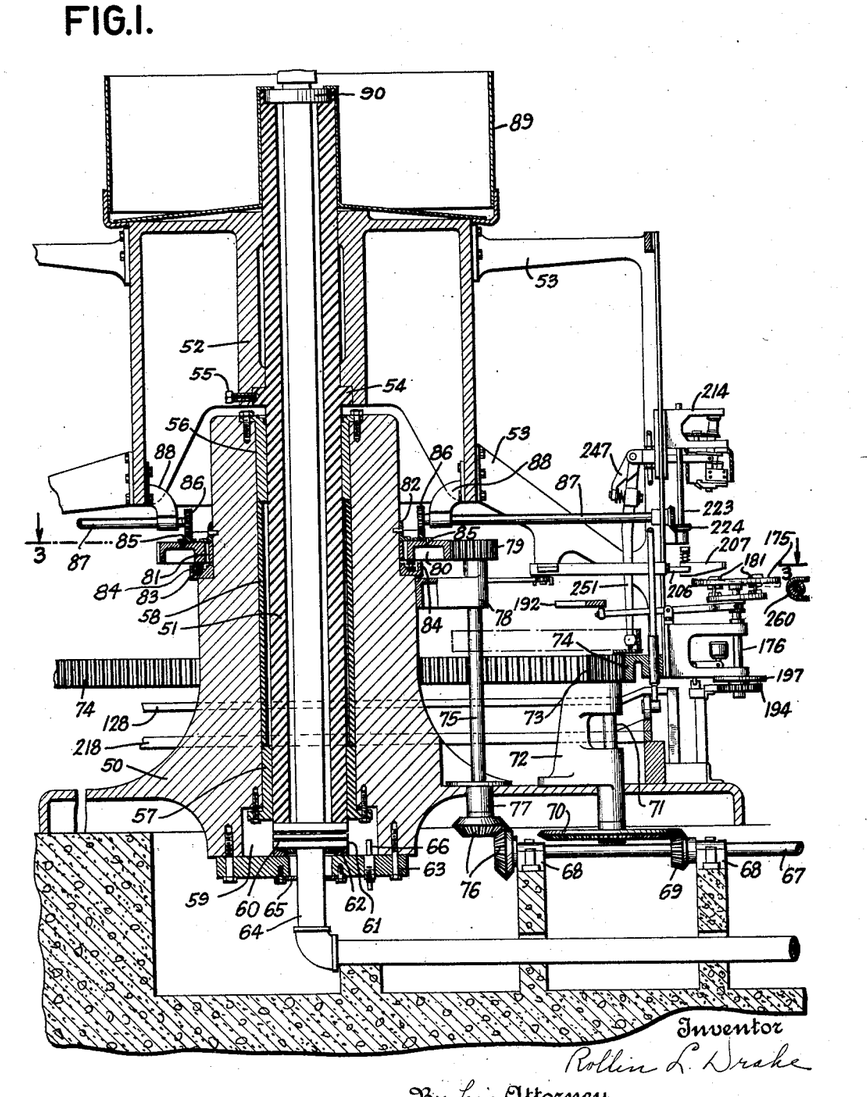
Figure 1 is a view in sectional elevation, partially cut away, of a capping machine embodying the features of the invention.

By reference to Figure 1 of the drawings, it will be seen that in the particular embodiment of the invention thus illustrated the apparatus includes a hollow base or supporting element 50 through which extends a shaft 51 provided with a hub 52 carrying a plurality of radial arms 53. As illustrated, the shaft 51 may be formed with a flange of collar 54 by which the hub is secured thereto, as by means of set-screws 55. The shaft 51 works within an upper bushing 56, lower bushing 57 and an intervening sleeve 58. The pedestal 50 may conveniently be formed with a hollowed-out portion 59 to form a lubricant housing or reservoir for the main bearings of the shaft 51 located therein. The main bearing is shown as consisting of ball-bearings 60 and ball-races 61. An alignment plate 62, supported by the closure plate 63, serves to hold the bearings in proper position. The shaft 51 is hollow to accommodate a supply pipe 64 which serves to admit to the apparatus the fluid to be dispensed. The plate 63 is formed with a central opening through which the supply pipe 64 passes; a guide plate 65 may be provided to form a closure about the supply pipe. A lubricant overflow pipe 66 may be provided.

Power for operating the apparatus may be supplied by a shaft 67 suitably mounted in bearings 68 and operated by any convenient means. The shaft 67 carries a bevel pinion 69 which meshes with a bevel gear 70 mounted on shaft 71 suitably supported in a bearing block 72. The shaft 71 carries a pinion 73 in mesh with a ring gear 74 which is secured to the several arms 53. It is apparent that when the shafts 67 and 71 are rotated, the apparatus embracing the several filling and capping units is rotated upon the shaft 51 as an axis.

The shaft 67 may also be geared to an intermediate shaft 75, as by means of bevel pinions 76. The shaft 75 is shown mounted in lower bearing 77 and upper bearing bracket 78 and carries a pinion 79 in mesh with a ring gear 80 which is shown as being rotatably mounted in a combination bearing comprising a radial bearing 81 secured by a retainer ring 82 and a thrust bearing 83 supported on an annular seat 84. The ring gear 80 carries a bevel ring gear 85 which meshes with a plurality of pinions 86 mounted on shafts 87. The inner ends of the shafts 87 are shown as being supported on bearing brackets 88 attached to the hub 52. The shafts 87 serve to operate the several capping units, as is hereinafter more fully explained.

Supporting tables

Means are provided on the main rotary element or conveyor for supporting and holding the cans or containers which are to be capped. For this purpose individual tables 175, each adapted to support a single container, are mounted at the upper ends of shafts 176 carried by suitable brackets secured to adjacent arms 53 or faces 53a thereof. These tables, as more fully explained in the parent application, are rotatably mounted so that the containers may be carried from filling to capping positions and vice versa. The upper surface of each table is inclined at a slight angle to the horizontal so that the capping operation may be performed on an elevated corner or side of the container, thus minimizing the danger of spilling any of the contents. Suitable gripping devices 181 are also provided on each of the tables for the purpose of holding the containers securely during the operation of certain devices including the capping units. Since the details of the supporting and holding means form no part of the invention covered in this case, they need not be further described herein but reference may be had to the parent application for a full disclosure.

Discharge mechanism

Figure 3:
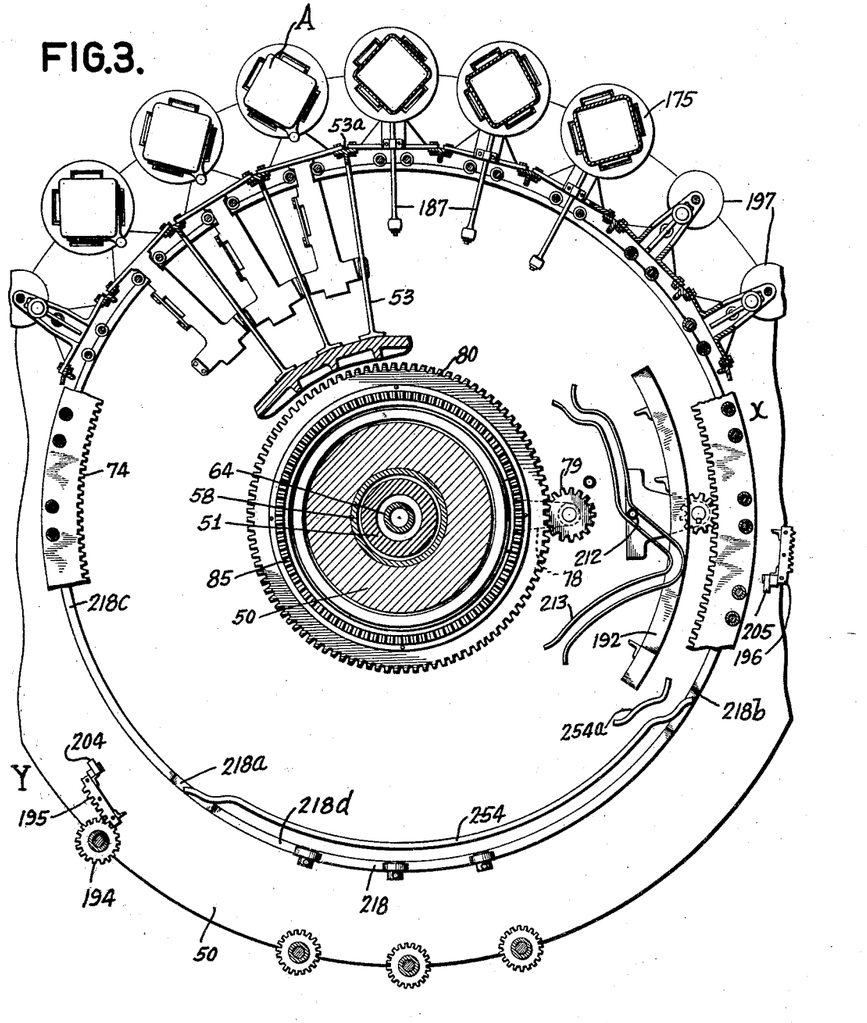
Figure 3 is a sectional plan view taken on the line 3—3 of Figure 1. It shows particularly the relation of certain cams which are operative at different times during the cycle of operation.
Figure 4:
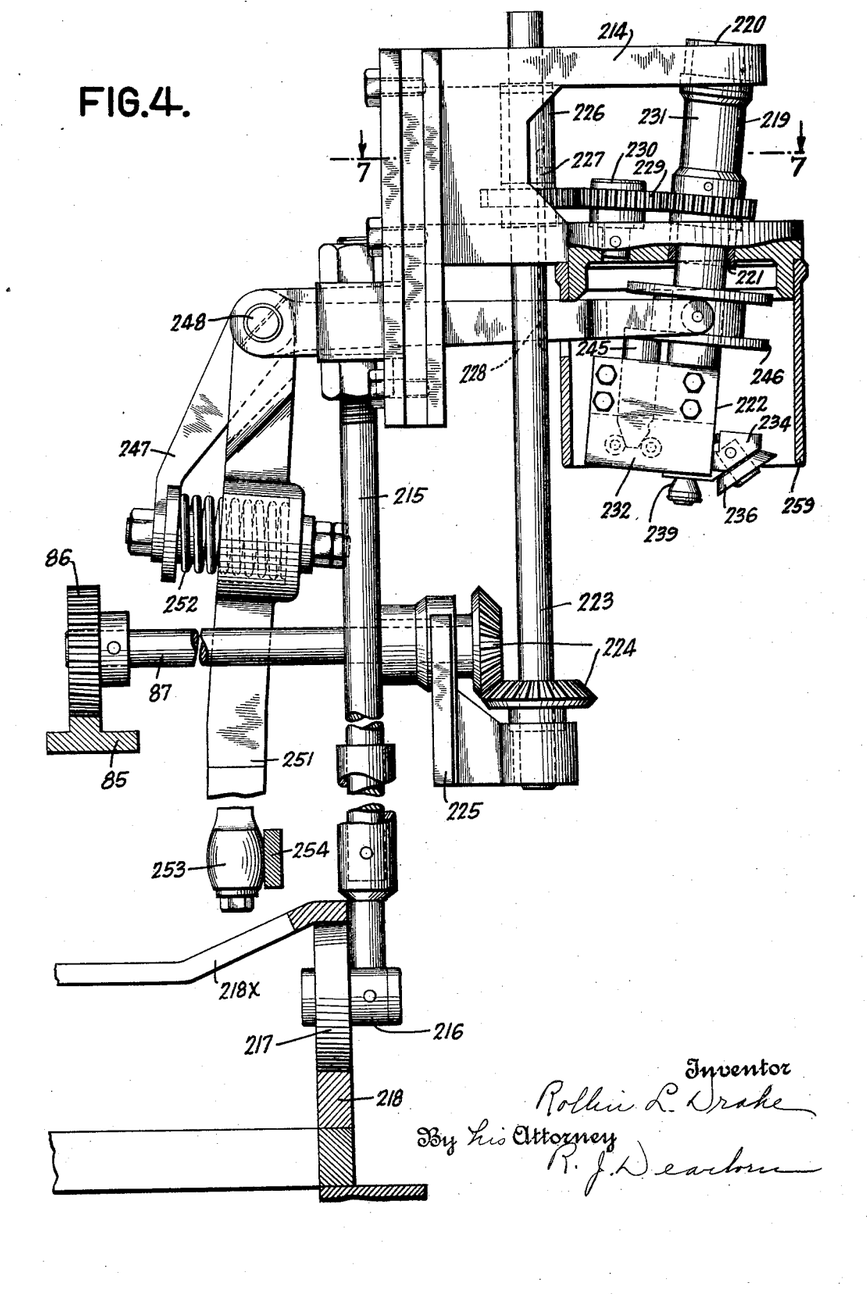
Figure 4 is a side elevation of one of the capping units.
Figure 5:
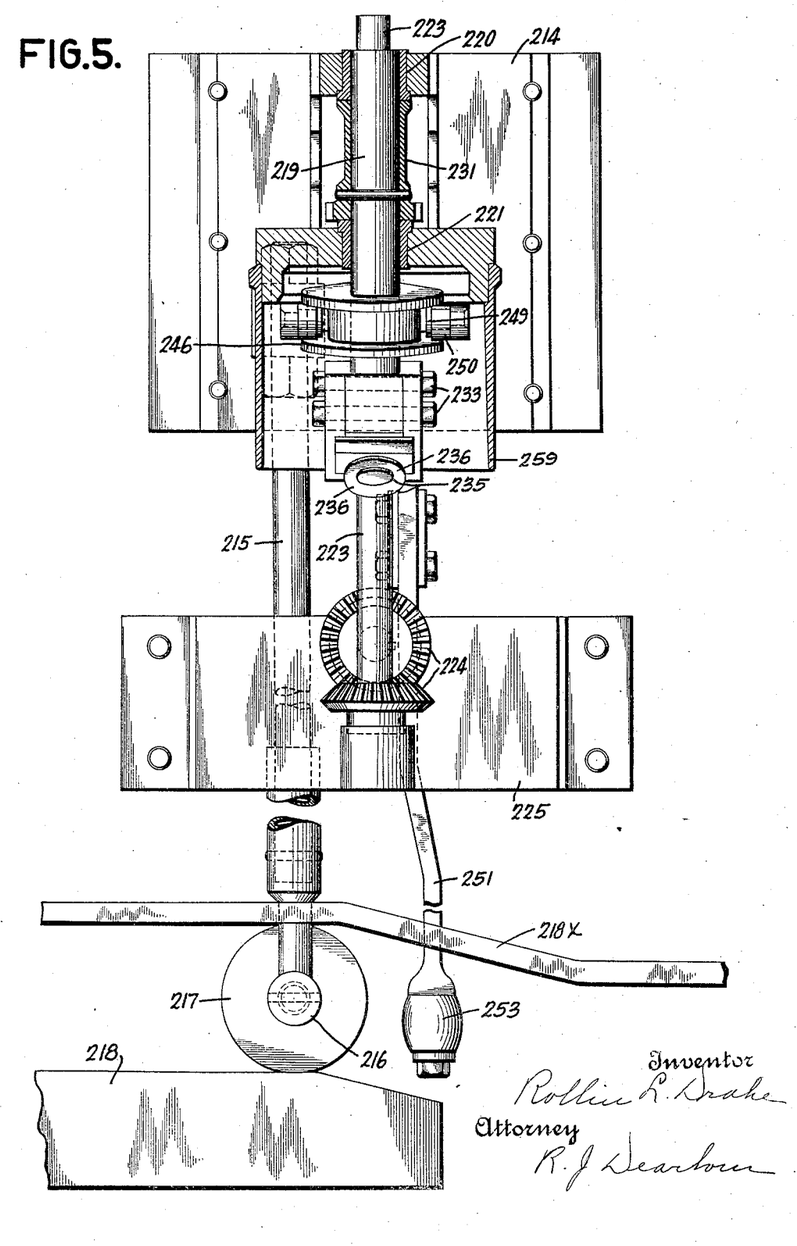
Figure 5 is a front elevation of such a unit.

Suitable devices are provided for ejecting the containers from the machine after the capping operation has been completed. These devices comprise an ejector hand 207 associated with each of the supporting tables 175 and carried by the main rotating structure. The hands are of such configuration as to be best suited for the ejection of the particular size and shape of container employed. Each hand is connected to a push rod 206 which at its inner end carries a roller 212 adapted to co-operate with the raceway of a cam 213 (Fig. 3). This cam is so formed as to operate each hand 207 to quickly eject the container from the related table as the latter passes a suitable platform or conveyor 260. Inasmuch as the details of the ejector mechanism form no part of the invention covered in this case, they will not be described further herein but reference may be had to the parent application for these details.

Capping tools

Figure 6:
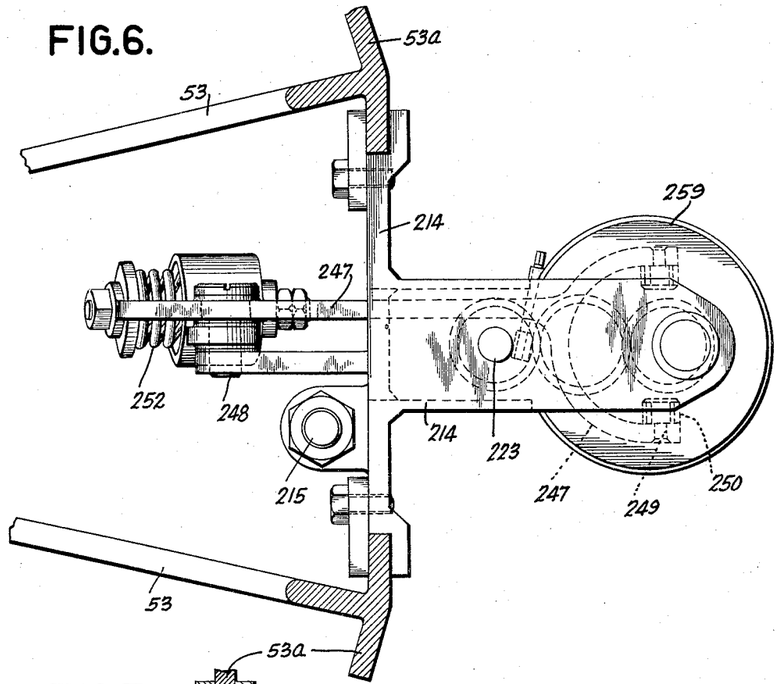
Figure 6 is a plan view of a capping unit.
Figure 7:
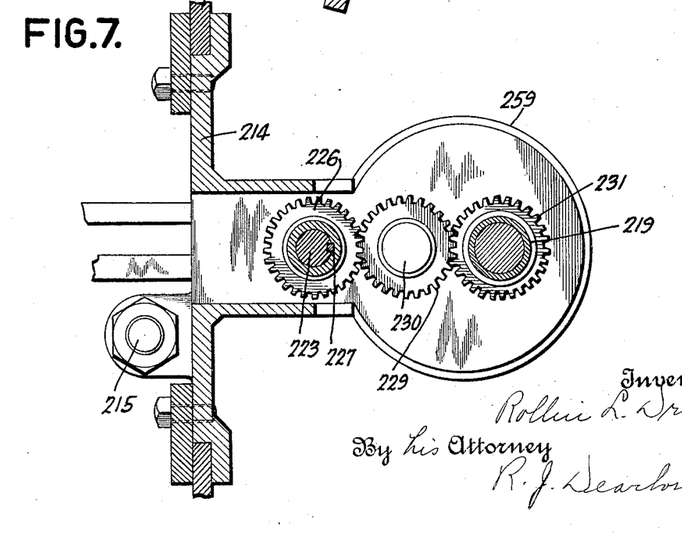
Figure 7 is a section taken on the line 7—7 of Figure 4.

The specific type of capping tool described herein is illustrated in Figures 4–15 inclusive. The capping mechanism thus shown is adapted to be moved to and from the operating position at predetermined points in the cycle of operation of the machine and is shown as being supported on a bracket 214 slidably mounted on a pair of adjacent arms 53 or faces 53a thereof (Figs. 6 and 7). Cam-controlled means is shown for actuating the bracket. Thus the bracket is supported on a push rod 215 carried on a stud 216 and roller 217 which travels on a cam 218. It is preferable to form the roller 217 with a periphery which constitutes a surface of a cone whose center is the center of the machine or the center of shaft 51, the cam track having a corresponding co-operating surface. Such a construction reduces to a minimum the friction on the rollers in passing over the circular cam. By reference to Figure 3 it will be seen that the cam 218 includes inclined surfaces at 218a and 218b between the upper level 218c and lower level 218d. While ordinarily gravity may be relied on for causing the capping mechanism to be lowered in the operation, an additional cam 218x may be provided (see Figure 4) to positively move the capping unit into operating position.

The capping tool includes a shaft 219, shown as being journaled in bushings 220 and 221 supported on the bracket 214, and a block portion 222 illustrated as being integral with the shaft. As hereinbefore pointed out, the several shafts 87 supply power to the several capping units. Each shaft 87 is geared to a shaft 223 by bevel pinions 224, the shaft 223 and outer end of shaft 87 being suitably journaled on a bracket 225 fixed to a pair of adjacent arms 53 or faces 53a thereof. Slidably mounted on the shaft 223 is a sleeve gear 226, the sleeve having a key 227 adapted to travel in a slot 228 formed in shaft 223. Power is transferred from the sleeve gear 226 on shaft 223 to the capper shaft 219, as by means of an intermediate gear 229, mounted on stud 230 supported on bracket 214, and a sleeve gear 231 pinned to the capper shaft.

A pair of side plates 232 is secured to the block 222, as by means of bolts 233. Slidably mounted on shoulders on the side plates is a carriage 234 which carries a pin 235 supporting a roller 236 formed with a bevelled portion 236a. Slidably supported on the block 222, or preferably in an opening within the carriage 234, is an inner carriage 237 which carries a stud 238 upon which is mounted a roller 239 formed with a bead 239a. The rollers 236 and 239 constitute the capper rollers of the mechanism and are arranged at such angles and in such relationship to each other as is desired, having in mind the particular crimping or capping operation it is intended to perform.

Resilient means is provided to exert pressure on the slidable carriages 234 and 237 in such a manner as to tend to move the carriages, and consequently the capper rollers, apart. This resilient means consists of a pair of springs 240 secured in recesses in the carriages. Mechanism, preferably cam-controlled, is provided for moving the carriages against the tension of springs 240 so as to bring the capper rollers into position for the capping operation. Thus, the outer carriage is equipped with a pin 241 carrying a roller 242 and the inner carriage is provided with a pin 243 carrying a roller 244. A cam bar 245 is adapted to engage between the rollers 242 and 244 so as to move the capping rollers 236 and 239 toward each other. The cam bar is secured to a clutch member 246 which is slidably mounted on the shaft 219. A lever 247 fulcrumed on a pin 248 has a yoked end with which to engage the clutch 246, each end of the yoke preferably being equipped with a stud 249 carrying a roller 250 adapted to travel in a peripheral groove in the clutch member 246. A cam lever 251 is also pivoted on the pin 248 and is suitably connected to the lever 247, as by resilient connecting means 252. The cam lever carries a roller 253 adapted to engage cams 254 and 254a. The position of the cams with respect to the cycle of operation of the machine is clearly shown in Figure 3. When the roller engages with the cam 254, the lever 251 is moved to the left (as viewed in Figure 4) thereby lowering the yoked end of lever 247. The clutch member 246 is thereby actuated to move the cam point 245 between the rollers 242 and 244 and bring the capper rollers 236 and 239 into capping position. When the roller 253 comes in contact with cam 254a, the lever 251 is moved to the right (as viewed in Figure 4) thereby removing the cam bar 245 from engagement between the rollers 242 and 244. The capping tool may be provided with a guard 259.

Figure 14:
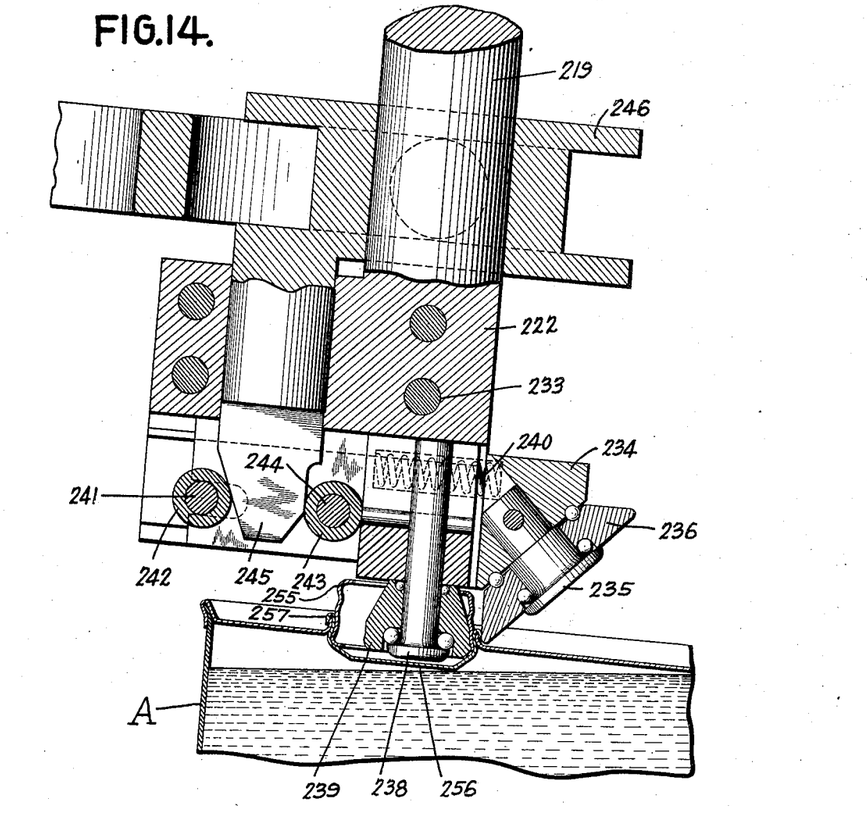
Figure 14 is an enlarged section showing the capping rollers in operation.
Figure 15:
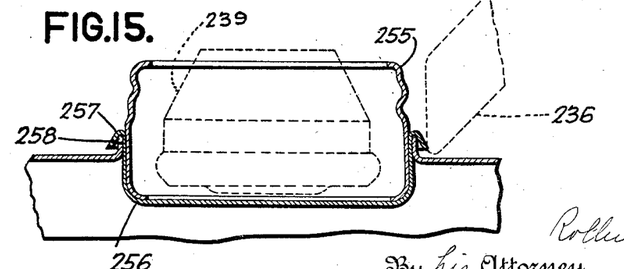
Figure 15 is a detail view in section, on an enlarged scale, illustrating the capping rollers in operation.

For illustrative purposes the capping tool is shown in Figures 14 and 15 as being applied to a screw neck type of cap. Thus, the can A is shown with a screw neck or thimble 255 seated in a cap or closure member 256 having a peripheral flange 257 or rim adapted to be spun over a flange 258 formed about an opening in the can A. Figure 15 shows the capping rollers 236 and 239 in position at the beginning of the capping operation and Figure 14 shows the capping mechanism at the completion of the operation with the rim 257 of the closure member 256 spun over the flange 258 and the member 256 bulged or expanded against the radius of, and under, the flange 258 so as to form a seal. It is to be understood that in the practice of the invention, various types of tops, caps, or closures may be employed.

*Operation*

In order that the co-operation of the various portions of the machine described in the foregoing sections may be more readily understood, a brief summary of the operation of the machine will now be given.

Figure 2:
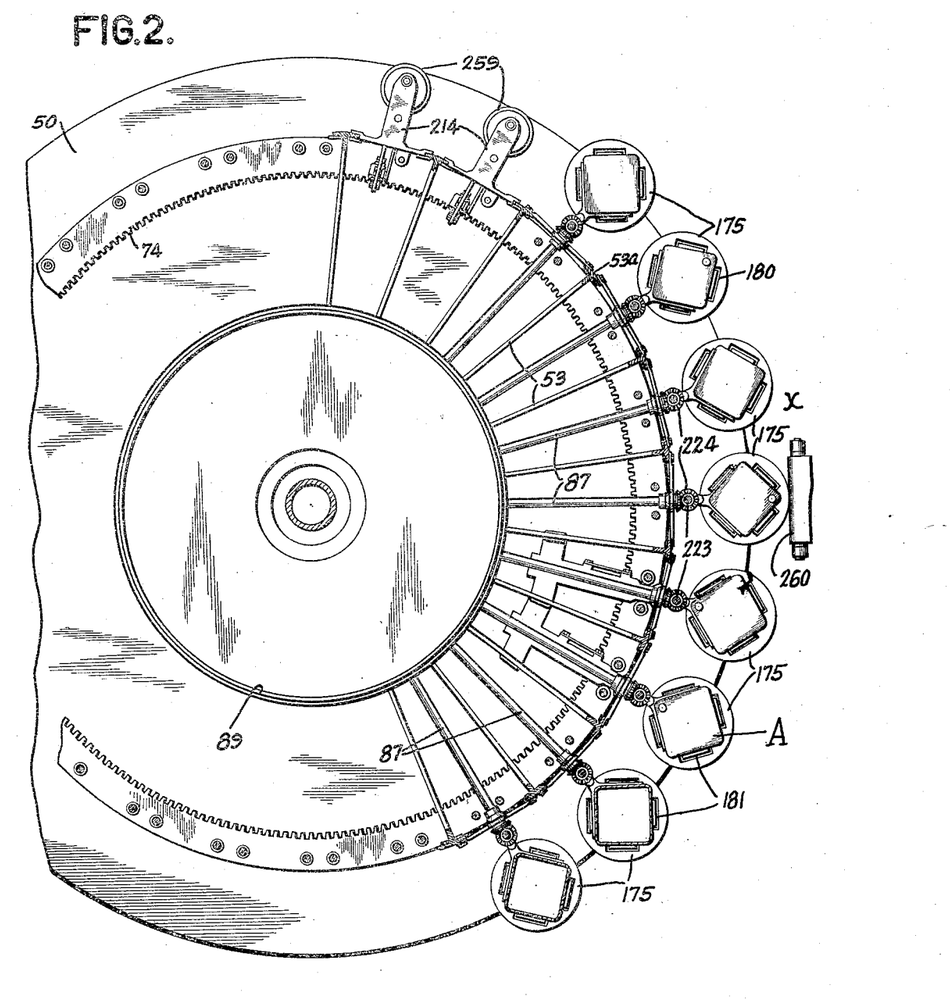
Figure 2 is a plan view with certain parts omitted, other parts cut away, and parts shown in sections taken along planes at different elevations.

The main rotating frame of the machine carried by the shaft 51, hub 52, and the radial arms 53, will be continuously rotated in a counter clock-wise direction, as viewed in Figures 2 and 3, by the connections from the driving shaft 67 to the pinion 73 and the internal ring gear 74. This rotating frame carries with it through each cycle the plurality of container supports 175, as well as the series of capping units, one of which is associated with each of these supports. As a support or table 175 moves past the point indicated X in Figures 2 and 3, an operator will place a container on the table in the position in which it may be gripped by the holding devices 181. If desired, automatic means might be provided for feeding the containers successively onto the tables as they pass the point X.

During slightly more than the first half cycle of rotation of the rotary element, the container on a particular table will be filled with a measured quantity of fluid material by means of the mechanism which forms no part of the invention covered in this case but which is fully disclosed in the parent application. After the filling operation has been completed, the container is brought to the position where the drop in the cam 218, designated at 218a of Figure 3, will cause the capping tool to descend. For this purpose the entire supporting frame 214 will be slid downwardly along the guide surfaces 53a of the radial arms of the main rotating structure. This downward movement of the capping tool will serve to carry the capping rollers 236 and 239 into the position indicated in Figure 15.

Figure 8:
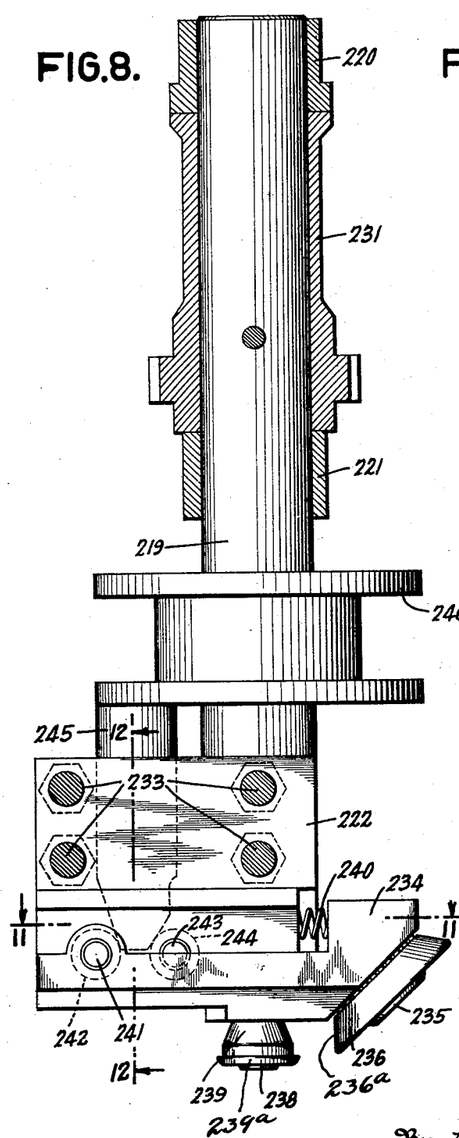
Figure 8 is an enlarged view in side elevation, partly in section, showing the spindle and head of the capping unit.
Figure 9:
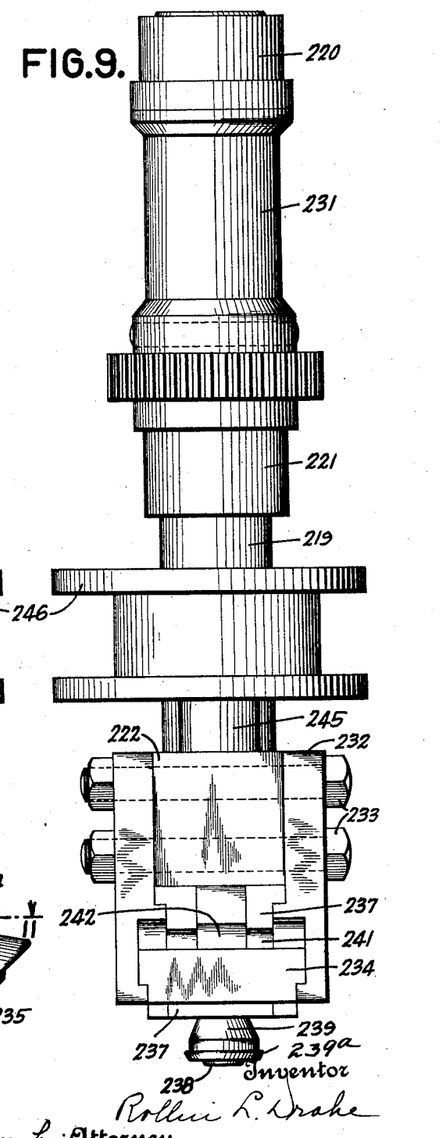
Figure 9 is a front elevation of the same.
Figure 10:
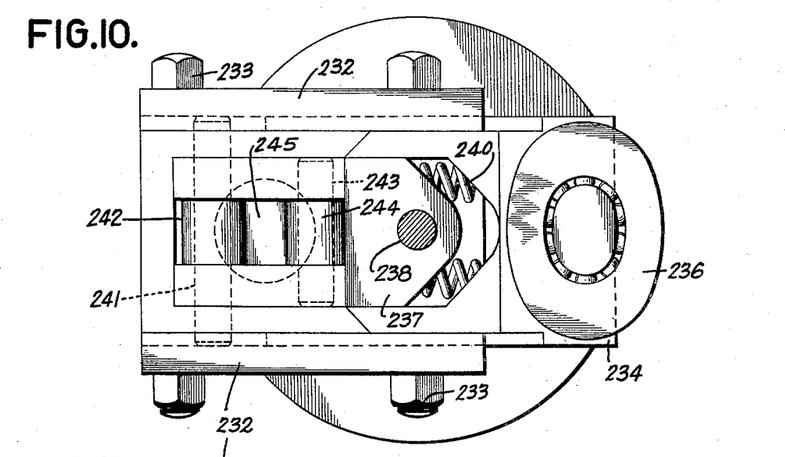
Figure 10 is a bottom view of these parts.
Figure 11:
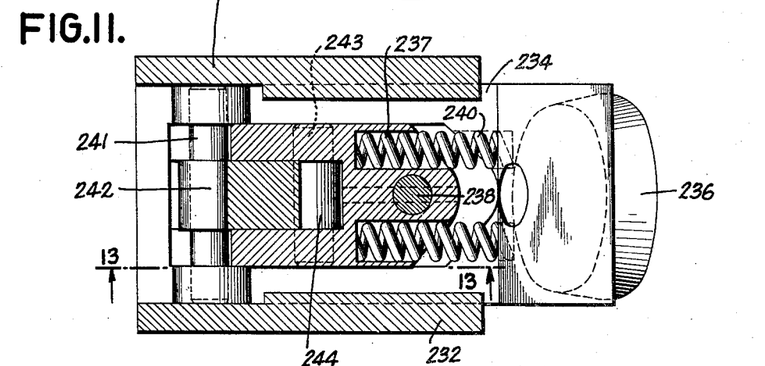
Figure 11 is a section taken along line 11—11 of Figure 8.
Figure 12:
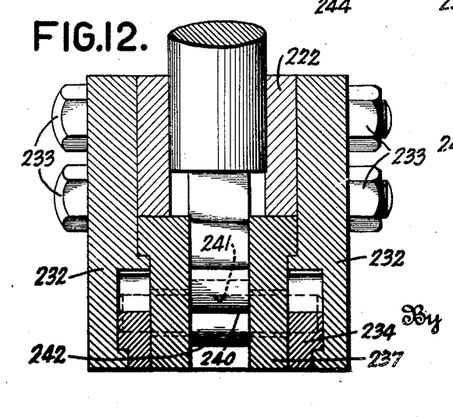
Figure 12 is a vertical section taken along the line 12—12 of Figure 8.
Figure 13:
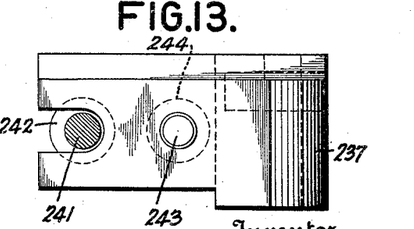
Figure 13 is a section in detail taken along the line 13—13 of Figure 11.

The entire capping tool or unit indicated in Figures 8 and 9 will be constantly rotated by means of the supporting spindle 219 during the entire cycle of operation of the machine. This is brought about through the driving connections from the shaft 223 having keyed thereto the sleeve gear 226. This shaft in turn is driven by the shaft 87 which carries a pinion 86 co-operating with the bevel ring gear 85. It will be clear that even if the ring gear 85 were held stationary, the movement of the capping unit, including the bodily movement of the pinion 86 over this gear, would tend to rotate the shaft 87. However, since it is desired to impart a somewhat greater speed of rotation to the capping parts, the ring gear 85 is driven in the opposite direction from that in which the main rotary element is driven. For this purpose connections including the shaft 75 and pinion 79, driven by the main power shaft 67, are provided.

Now, as the constantly rotating capping tool is lowered into co-operation with the cap, as shown in Figure 15, due to the drop at 218a in the annular cam member, the capping rollers 236 and 239 are ready to be forced together to grip the edge of the cap and perform the crimping operation. For this purpose the roller 253 comes in contact with the cam member 254 and causes the clutch member 246, with its cam bar 245, to be lowered. The cam formation at the lower end of the bar 245 serves to separate the rollers 242 and 244, thereby bringing the crimping rollers 236 and 239 together. After the crimping operation has been completed, the roller 253 encounters the cam 254a and brings about the release of the crimping rollers. Immediately thereafter, the capping tool is lifted by the co-operation of the roller 217 with the rise 218b in the circular cam 218. Now, by the co-operation of the roller 212 on the push rod 206 with the raceway of the cam 213, the ejector hand 207 is operated to discharge the capped container from the machine and onto the platform or conveyor 260. The table 175 is then ready to receive a new container at the point X.

It will be understood that each of the plurality of units, including the table 175 and the related capping tool, will follow through the cycle of operation indicated and that considered as a group, these units will enter upon the different phases of the cycle in successive order.

While the invention has been decribed in detail as applied to a specific form of machine it is to be understood that many variations in construction and arrangement may be made without departing from the general spirit of the invention. It is not desired to be limited in its interpretation other than by the scope of the claims which follow:

What I claim is:

1. In a can sealing apparatus, a rotary element, a slidable element carried by said rotary element, co-acting capping rollers mounted on the slidable element and comprising opposed rollers, a cam for actuating said slidable element so as to move the capping element to and from operating position, means adapted to move the capping rollers toward each other and a cam for actuating said means.

2. In a can sealing machine, a rotary element, a slidable member carried by said rotary element, co-acting capping rollers mounted on the slidable member, and a circular cam track for actuating the slidable member so as to raise and lower same at predetermined points in the cycle of the rotary element.

3. In a can sealing machine, a rotary element, a movable member carried by said rotary element, a capping element mounted on the movable member and comprising co-acting rollers, means for actuating the movable member at predetermined points in the cycle of the rotary element, and means for moving said rollers into operative position at a predetermined point.

4. In a machine of the class described a rotary element, a capping tool slidably carried by said element, said tool including co-acting capping elements, means for sliding said tool bodily into effective position at a predetermined point in the cycle of said rotary element and means for operating said tool to apply a cap to a container.

5. In a machine of the class described an endless conveyor adapted to support a container to be sealed, a capping tool slidably mounted on said conveyor, means for bodily sliding said tool into effective relation with the container when it reaches a predetermined position upon the movement of said conveyor, and means for operating said tool to seal the container.

6. In a machine of the class described an endless conveyor adapted to support a container, a rotatable capping tool, slidably mounted on said conveyor, means for continuously rotating said tool and means for sliding the tool into effective position at a predetermined point in its movement with the conveyor.

7. In a capping device a bodily shiftable block, means for rotating said block, a pair of co-acting crimping wheels carried by said block, said wheels being movable toward and away from each other, cam means for moving said wheels toward each other, and means for shifting said block to carry the wheels into effective relation to a cap.

8. In a capping device a rotatable block, a pair of co-acting crimping rollers, each independently movable on said block, resilient means for normally urging said rollers apart and cam means for forcing said rollers together.

9. In a capping device a rotatable block, a pair of co-acting crimping rollers carried by said block and adapted to engage opposite sides of the edge of a cap to be crimped, one of said rollers being movably mounted on said block, means for normally holding said rollers separated, and means for forcing said rollers together to grip between them the edge of a cap to be crimped.

10. In a capping device a rotatable spindle, a pair of co-operating crimping rollers carried thereby, said rollers being relatively movable toward and away from each other and adapted, when moved toward one another, to grip between them the edge of cap to be crimped, and means for shifting one of said rollers toward and away from the other.

11. In a capping device a rotatable spindle, a pair of co-operating crimping rollers carried thereby, said rollers being relatively movable toward and away from each other and adapted, when moved toward one another, to grip between them the edge of cap to be crimped, a bevelled edge formed on one of said rollers, a bead formed around the periphery of the other of said rollers, and cam controlled means for shifting one of said rollers toward and away from the other.

12. In a machine of the class described a power shaft, a spindle adapted to be continuously rotated thereby, a slidable frame adapted to support said spindle, a pair of crimping rollers carried by said spindle, one of said rollers being movable toward and away from the other, means for supporting a container to be capped, means operated by said shaft for sliding the frame to carry the rollers into co-operative relation with a container, and means operated by said shaft for moving said movable roller toward the other to grip the edge of a cap to be crimped.

13. In a machine of the class described a driving shaft, a spindle adapted to be rotated thereby, said spindle being longitudinally movable, crimping devices carried by said spindle, said devices being relatively movable to grip the edge of a cap to be crimped, means for supporting a container to be capped, means for moving said spindle longitudinally to carry said devices into co-operative relation with the container, and means for moving said devices to grip the edge of the cap.

14. In a capping device a rotatable spindle, relatively movable crimping devices carried by said spindle and adapted to engage opposite sides of the edge of a cap to be crimped, one of said devices comprising a roller having a bevelled edge, and means for producing relative movement between said devices to cause them to grip the opposite sides of the edge of the cap to be crimped while said spindle is rotating to form a seam.

15. In a machine of the class described an endless conveyor adapted to support containers to be capped, means for moving said conveyor, a plurality of capping tools carried by said conveyor, each of said tools comprising a rotatable and bodily shiftable block, means for rotating said blocks including a driving rack moving in the opposite direction from the movement of said conveyor, and camming means adapted to shift said blocks to render said tools successively effective as said conveyor is moved.

16. In a machine of the class described a continuously rotating member adapted to support containers to be capped, a plurality of capping tools slidably carried by said member, means for operating said capping tools upon the rotation of said member, and means for successively sliding said tools into effective position to cap said containers as they reach a predetermined point.

17. In a machine of the class described, a pair of co-acting rollers adapted to grip the opposite sides of the edge of the cap to be crimped, means for rotating said rollers, means for forcing said rollers toward one another to grip the opposite sides of the edge to be crimped, and means for moving the rotating rollers together around the edge of the cap while gripping the edge between them to form a seam.

In witness whereof I have hereunto set my hand this 25th day of April, 1929.

ROLLIN L. DRAKE.

CERTIFICATE OF CORRECTION.

Patent No. 1,900,637.   March 7, 1933.

ROLLIN L. DRAKE.

It is hereby certified that error appears in the printed specification of the above numbered patent requiring correction as follows: Page 4, line 117, claim 1, for "co-acting" read "a", and for "rollers" read "element"; and that the said Letters Patent should be read with these corrections therein that the same may conform to the record of the case in the Patent Office.

Signed and sealed this 16th day of May, A. D. 1933.

(Seal)

M. J. Moore.
Acting Commissioner of Patents.